US009706255B2

(12) United States Patent
Xu et al.

(10) Patent No.: US 9,706,255 B2
(45) Date of Patent: Jul. 11, 2017

(54) METHOD AND APPARATUS FOR CONTENT DISTRIBUTION FOR MULTISCREEN VIEWING WHEREIN VIDEO PROGRAM AND INFORMATION RELATED TO THE VIDEO PROGRAM ARE TRANSMITTED TO A SECOND DEVICE BUT NOT TO A FIRST DEVICE WHEN THE DISTANCE BETWEEN THE TWO DEVICES IS GREATER THAN A PREDETERMINED THRESHOLD

(71) Applicant: THOMSON LICENSING, Issy de Moulineaux (FR)

(72) Inventors: Yan Xu, Beijing (CN); Lin Du, Beijing (CN); Wei Zhou, Beijing (CN)

(73) Assignee: THOMSON LICENSING, Issy les Moulineaux (FR)

( * ) Notice: Subject to any disclaimer, the term of this patent is extended or adjusted under 35 U.S.C. 154(b) by 0 days.

(21) Appl. No.: 14/892,356

(22) PCT Filed: Jun. 5, 2013

(86) PCT No.: PCT/CN2013/076765
§ 371 (c)(1),
(2) Date: Nov. 19, 2015

(87) PCT Pub. No.: WO2014/194486
PCT Pub. Date: Dec. 11, 2014

(65) Prior Publication Data
US 2016/0105718 A1    Apr. 14, 2016

(51) Int. Cl.
*H04N 21/4623* (2011.01)
*H04N 21/25* (2011.01)
(Continued)

(52) U.S. Cl.
CPC ....... *H04N 21/4623* (2013.01); *G06F 1/1626* (2013.01); *H04H 20/57* (2013.01);
(Continued)

(58) Field of Classification Search
CPC .. H04N 21/238; H04N 21/2385; H04N 21/24; H04N 21/2402; H04N 21/2389;
(Continued)

(56) References Cited

U.S. PATENT DOCUMENTS 7,196,722 B2    3/2007    White et al.
7,698,723 B2 *  4/2010    Hicks, III ............... H04N 5/76
                                                            725/142
(Continued)

FOREIGN PATENT DOCUMENTS

CN    101662617    3/2010
CN    101854492    10/2010
(Continued)

OTHER PUBLICATIONS

Search Report date of mailing Mar. 13, 2014.
(Continued)

*Primary Examiner* — Hoang-Vu A Nguyen-Ba

(57) ABSTRACT

A method for distributing a video program to first and second devices is disclosed. The method comprises receiving a request for the video program from one of the first and second devices, both registered in an account at the server; transmitting the video program, but not information related to the video program, to a first selected one of the two devices according to a distance between the two devices; and transmitting the information related to the video program, but not the video program, to a second selected one of the two devices according to the distance.

18 Claims, 8 Drawing Sheets

(51) Int. Cl.
| | |
|---|---|
| H04N 21/45 | (2011.01) |
| H04N 21/41 | (2011.01) |
| H04N 21/258 | (2011.01) |
| H04N 21/472 | (2011.01) |
| H04N 21/414 | (2011.01) |
| G06F 1/16 | (2006.01) |
| H04H 20/57 | (2008.01) |
| H04N 21/61 | (2011.01) |
| H04N 21/2225 | (2011.01) |
| H04N 21/232 | (2011.01) |
| H04N 21/238 | (2011.01) |
| H04L 12/28 | (2006.01) |
| H04L 12/54 | (2013.01) |
| H04N 21/2385 | (2011.01) |
| H04N 21/24 | (2011.01) |
| H04N 21/2389 | (2011.01) |
| H04N 21/266 | (2011.01) |
| H04N 21/431 | (2011.01) |
| H04N 21/4722 | (2011.01) |
| H04N 21/81 | (2011.01) |

(52) U.S. Cl.
CPC ........ *H04L 12/2801* (2013.01); *H04L 12/569* (2013.01); *H04N 21/2225* (2013.01); *H04N 21/232* (2013.01); *H04N 21/238* (2013.01); *H04N 21/2385* (2013.01); *H04N 21/2389* (2013.01); *H04N 21/24* (2013.01); *H04N 21/2402* (2013.01); *H04N 21/2407* (2013.01); *H04N 21/25* (2013.01); *H04N 21/25808* (2013.01); *H04N 21/25841* (2013.01); *H04N 21/26616* (2013.01); *H04N 21/4126* (2013.01); *H04N 21/41407* (2013.01); *H04N 21/4316* (2013.01); *H04N 21/4524* (2013.01); *H04N 21/472* (2013.01); *H04N 21/4722* (2013.01); *H04N 21/47202* (2013.01); *H04N 21/6131* (2013.01); *H04N 21/8126* (2013.01); *H04N 21/8133* (2013.01)

(58) Field of Classification Search
CPC .......... H04N 21/2407; H04N 21/26616; H04L 12/2801; H04L 12/569
USPC ................ 725/25, 62, 87, 95, 97; 348/14.07
See application file for complete search history.

(56) References Cited

U.S. PATENT DOCUMENTS

| | | | |
|---|---|---|---|
| 8,261,307 B1* | 9/2012 | Islam | H04N 21/41407 455/556.1 |
| 2002/0103554 A1 | 8/2002 | Coles et al. | |
| 2003/0229900 A1 | 12/2003 | Reisman | |
| 2008/0208839 A1 | 8/2008 | Sheshagiri et al. | |
| 2009/0100147 A1 | 4/2009 | Igarashi | |
| 2009/0183085 A1 | 7/2009 | Pasetto et al. | |
| 2009/0187955 A1 | 7/2009 | Sullivan et al. | |
| 2009/0249405 A1 | 10/2009 | Karaoguz et al. | |
| 2010/0037260 A1 | 2/2010 | Fukuda | |
| 2010/0146076 A1 | 6/2010 | Adriazola et al. | |
| 2010/0205628 A1 | 8/2010 | Davis et al. | |
| 2010/0245680 A1 | 9/2010 | Tsukada et al. | |
| 2010/0299552 A1 | 11/2010 | Schlack et al. | |
| 2011/0131332 A1 | 6/2011 | Bouazizi | |
| 2011/0163939 A1 | 7/2011 | Tam et al. | |
| 2012/0113092 A1 | 5/2012 | Bar-Zeev et al. | |
| 2012/0137329 A1 | 5/2012 | Patil et al. | |
| 2012/0146891 A1 | 6/2012 | Kalinli | |
| 2012/0227063 A1 | 9/2012 | Tsurumi | |
| 2012/0311640 A1 | 12/2012 | Cahnbley et al. | |
| 2013/0031160 A1 | 1/2013 | Carmichael | |
| 2013/0036011 A1 | 2/2013 | Roberts | |
| 2013/0051276 A1 | 2/2013 | Pantelias | |
| 2013/0074116 A1 | 3/2013 | Bruce et al. | |
| 2013/0124315 A1 | 5/2013 | Doughty et al. | |
| 2014/0051408 A1 | 2/2014 | Jenzowsky et al. | |
| 2014/0189753 A1* | 7/2014 | Cugnini | H04N 21/6131 725/62 |
| 2014/0279889 A1 | 9/2014 | Luna | |

FOREIGN PATENT DOCUMENTS

| | | |
|---|---|---|
| CN | 102388378 | 3/2012 |
| CN | 102647460 | 8/2012 |
| CN | 102845074 A | 12/2012 |
| CN | 102883185 | 1/2013 |
| CN | 102932280 | 2/2013 |
| CN | 102566049 | 5/2015 |
| EP | 1582965 | 10/2005 |
| EP | 2315429 | 4/2011 |
| JP | 2012038030 | 2/2012 |
| RU | 2460213 | 8/2012 |
| WO | WO2004021709 | 3/2004 |
| WO | WO2012015460 | 2/2012 |
| WO | WO2012126823 | 9/2012 |
| WO | WO2013059902 | 5/2013 |

OTHER PUBLICATIONS

DVB Organizationcm-GEM0004 v.6.7 companion screens. docxDVB, Digital Video Broadcastinggeneva Jan. 24, 2013p. 21, paragraph 7-p. 24, paragraph 12-p. 29.

* cited by examiner

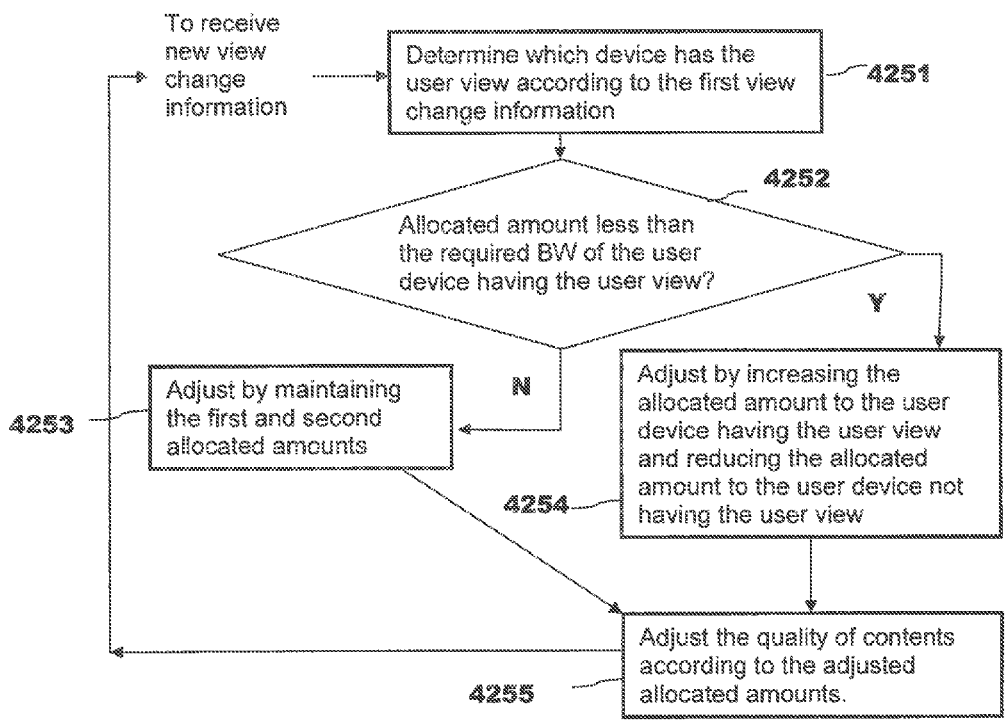

METHOD AND APPARATUS FOR CONTENT DISTRIBUTION FOR MULTISCREEN VIEWING WHEREIN VIDEO PROGRAM AND INFORMATION RELATED TO THE VIDEO PROGRAM ARE TRANSMITTED TO A SECOND DEVICE BUT NOT TO A FIRST DEVICE WHEN THE DISTANCE BETWEEN THE TWO DEVICES IS GREATER THAN A PREDETERMINED THRESHOLD

This application claims the benefit, under 35 U.S.C. §365 of International Application PCT/CN2013/076765 filed Jun. 5, 2013 which was published in accordance with PCT Article 21(2) on Dec. 11, 2014 in English.

BACKGROUND OF THE INVENTION

Field of the Invention

The present principles of the embodiments generally relate to distributing content for multi-screen viewing and more particularly to transmitting a requested video program to one of handheld user devices and a standalone user device and transmitting information related to the video program to one or more of the other user devices.

Background Information

It is reported that many people while watching a video program on a television view information related to the video program on a handheld electronic device, such as a mobile telephone devices, a tablet, a personal computer (PC), a remote control device, or another handheld device having Wi-Fi capability. The information related to the video program may include advertisements, promotional information, and program information related to the television program such as program title, program theme, program rating, stars, program category, program keywords, a program description, program type (e.g., audio, video, audio-visual, computer, Internet, and the like), and program repeat frequency (e.g., once per week, daily, etc.).

Accordingly, there is a need in the art to have a distribution system that better facilitates the above multi-viewing environment, while conserving the network bandwidth.

SUMMARY OF THE INVENTION

In accordance with an aspect of the present invention, a method for distributing a video program to first and second devices is disclosed. The method comprises receiving a request for the video program from one of the first and second devices, both registered in an account at the server; transmitting the video program, but not information related to the video program, to a first selected one of the two devices according to a distance between the two devices; and transmitting the information related to the video program, but not the video program, to a second selected one of the two devices according to the distance.

In one embodiment, the first device is registered as a standalone device and the second device is registered as a handheld device.

In another embodiment, the first selected one device is different from the second selected one device.

In another embodiment, the method further comprises determining available bandwidth B; determining a bandwidth requirement B1 of the first selected one device and a bandwidth requirement B2 of the second selected one device; if B<B1, allocating B to the first selected one device and no bandwidth to the second selected one device, and transforming the video program to satisfy B; and if B is not less than B1, allocating B1 to the first selected one device, if B−B1 is not less than B2, allocating B2 to the second selected one device, and if B−B1 is less than B2, allocating B−B1 to the second selected one device and transforming the no information related to the video program to satisfy B−B1.

In another embodiment, the method further comprises determining status of each of the two devices; if both devices are not active, terminating transmissions of the video program and the no information related to the video program; if both devices are active, maintaining transmissions of the video program and the no information related to the video program; and if only one device is active, transmitting both the video program and the no information related to the video program to the active device, and no video program and no information related to the video program to the inactive device.

In another embodiment, the method further comprises if the distance is less than a predefined threshold, selecting the first device as the first selected one device and selecting the second device as the second selected one device; and if the distance is greater than the predefined threshold, selecting the second device as the first and second selected one devices, and transmitting no video program and no information related to the video program to the first device.

In another embodiment, the method further comprises obtaining location information of the first device; obtaining location information of the second device; and determining the distance according to the obtained location information of the first device and the obtained location information of the second device. In one embodiment, obtaining the location information of the first device comprises checking distance information of the first device in a user profile of a user.

In one another embodiment, if the request is from the first device, the method further comprises if the distance is less than a predefined threshold, selecting the first device as the first selected one device and selecting the second device as the second selected one device; and if the distance is greater than the predefined threshold, selecting the first device as the first and second selected one devices, and transmitting no video program and no information related to the video program to the second device.

In accordance with an aspect of the present invention, a serve for transmitting a video program and information related to the video program to first and second devices, both registered in an account at the server is disclosed. The server comprises a storage; and a processor executing software stored in the storage; wherein the processor is configured to receive a request for the video program from one of the first and second devices; transmit the video program, but not information related to the video program, to a first selected one of the two devices according to a distance between the two devices; and transmit the information related to the video program, but not the video program, to a second selected one of the two devices according to the distance.

In one embodiment, the first device is registered as a standalone device and the second device is registered as a handheld device.

In another embodiment, the first selected one device is different from the second selected one device.

In another embodiment, the processor is configured to determine available bandwidth B of the server, a bandwidth requirement B1 of the first selected one device and a bandwidth requirement B2 of the second selected one device; if B<B1, allocate B to the first selected one device and transform the video program to satisfy B; if B is not less than B1, allocate B1 to the first selected one device, if B−B1 is not less than B2, allocate B2 to the second selected one device, and if B−B1 is less than B2, allocate B−B1 to the second selected one device and the processor is configured to transform the information related to the video program to satisfy B−B1.

In another embodiment, the processor is configured to determine status of each of the two devices; if both devices are not active, the processor terminates transmissions of the video program and the information related to the video program; if both devices are active, the processor maintains transmissions of the video program and the information related to the video program; and if only one device is active, the processor transmits both the video program and the no information related to the video program to the active device, and no video program and no information related to the video program to the inactive device.

In another embodiment, if the distance is less than a predefined threshold, the processor is configured to select the first device as the first selected one device and selecting the second device as the second selected one device; and if the distance is greater than the predefined threshold, the processor is configured to select the second device as the first and second selected one devices, and transmitting no video program and no information related to the video program to the first device.

In another embodiment, the processor is configured to obtain location information of the first device and location information of the second device, and determine the distance according to the obtained location information of the first device and the obtained location information of the second device. In one embodiment, if the processor fails to obtain the location information of the second device, the processor is configured to determine that the distance is greater than the predefined threshold.

In another embodiment, the processor is configured to obtain the location information of the first device by checking distance information of the first device in a user profile of a user.

In yet another embodiment, if the request is from the first device and if the distance is less than a predefined threshold, the processor is configured to select the first device as the first selected one device and selecting the second device as the second selected one device; and if the distance is greater than the predefined threshold, select the first device as the first and second one selected devices, and transmitting no video program and no information related to the video program to the second device.

In the server embodiments above, the storage may be replaced by storage means and the processor may be replaced by processing means.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIGS. 4A and 4B show exemplary processes for adjusting, by the proxy server, bandwidth for the wireless handheld user device and the standalone user device according the user view;

Figure 1:
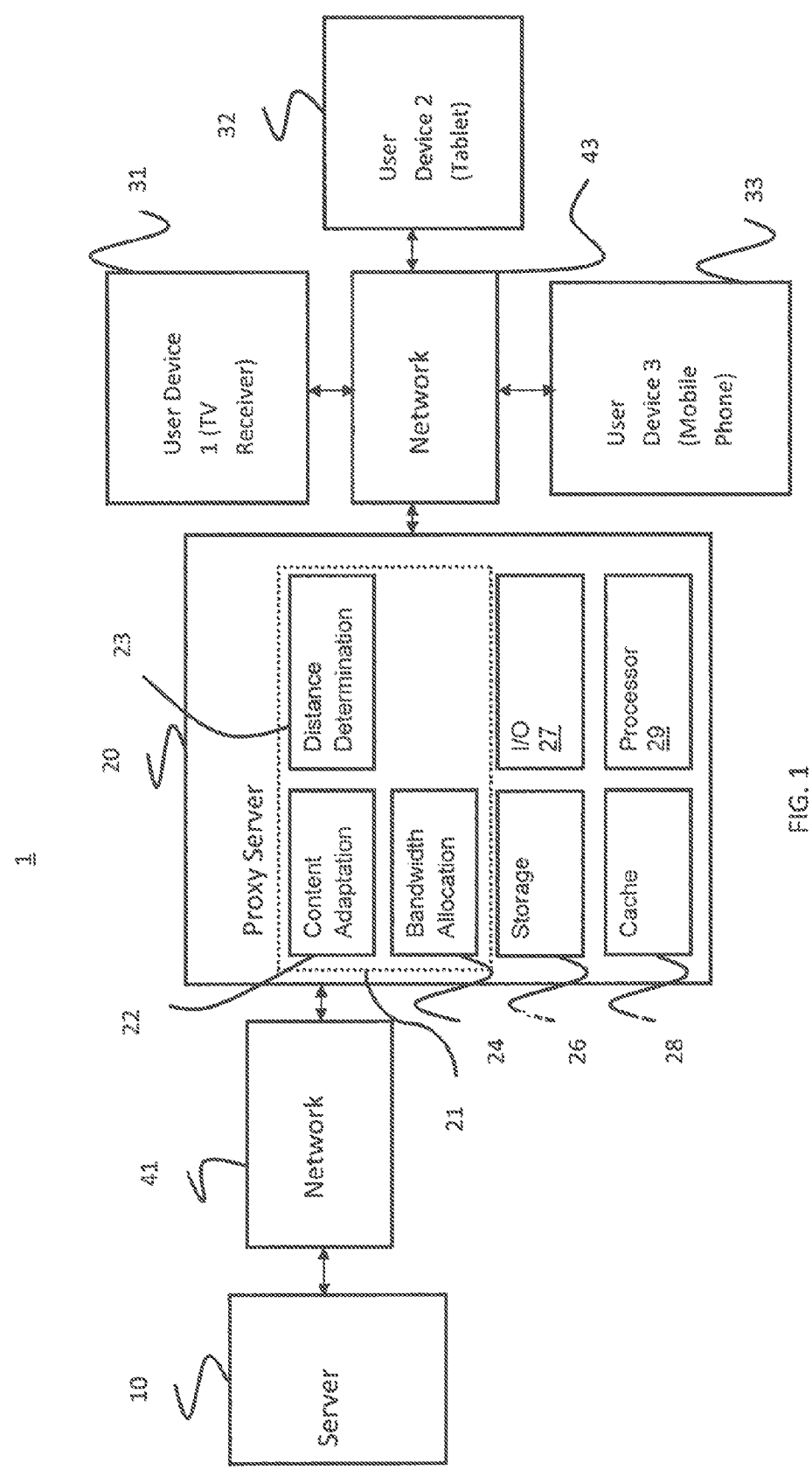
FIG. 1 shows a block diagram of relevant portions of a distribution system suitable for implementing exemplary embodiments of the present invention.

The exemplifications set out herein illustrate preferred embodiments of the invention, and such exemplifications are not to be construed as limiting the scope of the invention in any manner. For clarity of description, the same reference numbers may be used throughout the following description to represent the same or similar elements of the drawing figures.

DESCRIPTION OF THE PREFERRED EMBODIMENTS

Referring now to the drawings, and more particularly to FIG. 1, a block diagram showing an exemplary distribution system 1 suitable for implementing exemplary embodiments of the present principles of the invention is illustrated. The distributed system 1 includes a server 10, a proxy server 20, and user devices 31, 32, and 33. In this embodiment, the three user devices 31, 32, and 33 share the same user account at the proxy server 20 or the server 10, and are assumed to be used by the same user. User devices of other users can also be connected to the proxy server 20.

In this embodiment, the user device 31 is a standalone user device, and the user devices 32 and 33 are handheld user devices. The user device 31 in the embodiment is a television receiver having network access capability, such as Internet access capability, to receive a video program and information related to the video program. A television receiver may or may not have a display. Examples of such television receivers are set-top boxes, television sets, and video recorders having Internet access capability.

A standalone user device, as used herein, refers to a user device that is not moved often. It can be a portable device, such as a laptop docked on a docking station, as long as the user registers the portable device to the server 10 or the proxy server 20 as a standalone user device.

The handheld user devices 32 and 33 in this example are a tablet and a mobile phone, respectively. A handheld user device should be able to determine its location and report its location information to the server 10 or the proxy server 20. A handheld user device should also have network access capability. Examples of a handheld electronic user device are a mobile telephone, a tablet, a personal computer (PC), a remote control device, or another handheld device having Wi-Fi capability. Although preferably a handheld user device should be portable, it can be a non-portable device, such as a desktop PC, as long as the user registers the user device to the server 10 or proxy server 20 as a handheld user device. A user may do so because the user moves the desktop to different places, such as different dorms and apartments, frequently. Although in the embodiment, the handheld user devices are illustrated as wireless, the principles of the embodiment are equally applicable to wired handheld user devices that connect to networks with wires.

The user devices 31, 32, and 33 are connected to the proxy server 20 through a network 43, for example, the Internet, and the proxy server 20 is connected to the server 10 through another network 41. These two networks may be the same or different networks. If these two networks are different, they may connect to each other through an internetwork facility, such as a gateway.

The proxy server 20 includes storage 26 for storing data including, but not limited to, software 21 and other data associated with one or more computer applications including those described herein, on-screen display data, a user profile database, and a processor 29 for executing the software, and/or other data. The proxy server 20 also includes an input/output (I/O) block 27 and a cache 28, which can be a separate memory or a part of the storage 26. The software 21 illustratively includes a content adaptation module 22, a distance determination module 23, and a bandwidth allocation and adjustment module 24.

The storage 26 may include static random access memory (RAM), dynamic RAM, erasable programmable read only memory (EPROM), electrically erasable programmable read only memory (EEPROM), a hard disk (network, internal, or external), an optical disk (network, internal, or external), or any combination thereof. The storage device may be a local device or a network device.

The I/O block 27 is operative or configured or configured to perform I/O functions of the proxy server 20. According to an exemplary embodiment, I/O block 27 is operative or configured or configured to receive signals such as audio, video and/or data signals in a digital modulation format(s) in a wired and/or wireless manner from one or more networks such as cell phone, Internet (such as the networks 41 and 43) from the server 10 and the user devices 31, 32, 33, and other network sources, and to output signals in a wired and/or wireless manner to such one or more networks. The I/O block 27 may be embodied as any type of I/O interface capable of receiving wired and/or wireless signals, and may be comprised of one or more individual components (e.g., antenna(s), plug(s), etc.).

The processor 29 can be a single processor or a plurality of individual similar or different processors. The processor 29 is operative or configured to perform various signal processing and control functions (e.g., execute software code, etc.) of the proxy server 20 that facilitates and enables performance of the various embodiments and techniques of the present invention described herein.

According to an exemplary embodiment, the processor 29 receives the signals provided from I/O block 27 and performs and/or enables all necessary processing and control functions associated with the proxy server 20 via one or more microprocessors and/or other element(s). For example, the processor 29 is operative or configured to receive and process audio, video and/or data signals provided from the I/O block 27 by performing functions including tuning, demodulation, and error correction to thereby store digital data representing audio, video and/or data content such as user profile settings in the cache 28 and/or the storage 26.

Also according to exemplary embodiments, the processor 29 is operative or configured to perform and/or enable various other functions including, but not limited to, processing data inputs from the user devices 31-33, controlling functions of the proxy server 20 in response to user inputs, reading and writing data from and to the storage 26 and/or cache 28, enabling on-screen displays via a display, and/or other operations as may be described herein.

Also according to exemplary embodiments, the processor 29 receives from the I/O block 27 a request for a video program from one of a standalone user device and a handheld user device, both registered in a user account of a user at the proxy server 20, and in response to the request, transmits the video program, but not the information related to the video program, to a first selected one of the two user devices according to a distance between the standalone user device and the handheld user device; and transmits the information related to the video program, but not the video program, to a second selected one of the two user devices according to the distance.

Also according to exemplary embodiments, the processor 29 receives from the I/O block 27 a request for a video program from one of a standalone user device and a wireless handheld user device, both registered in a user account of the user at the server, transmits the video program, but not the information related to the video program, to one of the two user devices; transmits the information related to the video program, but not the video program, to the other user device; and responsive to first view change information of the user sent from one of the two user devices, adjusts bandwidth allocated to the user devices according to the user view, such that quality of content received by the user device having the user view is maximized. The processor 29 should determine which one of the user devices has the user view from the received first view change information.

A device has the user view when the processor 29 determines that the user is viewing or looking at the device.

As used herein, a quality of content is represented by the number of bits required for representing the content. A content represented by more bits has a better quality and the content represented by fewer bits has worse quality. A requested video program has an initial video quality, which should be the best quality of the video program. When the video program having the initial video quality is transformed or adapted, the number of bits required to represent the video program is reduced, resulting in the transformed or adapted video program having a quality worse than the initial video quality. Similarly, information related to the requested video program has an initial information quality, which should be the best quality of the information related to the requested video program. When information related to the requested video program having the initial information quality is transformed or adapted, the number of bits required to represent the information related to the requested video program is reduced, resulting in the transformed or adapted information related to the requested video program having a quality worse than the initial information quality.

In one embodiment, the proxy server 20 obtains location information of a standalone user device from the user profile database, and obtains location information of a wireless handheld user device sent by the wireless handheld user device.

In one embodiment, the user profile database is in the proxy server 20 only and there is no need to store a copy in the server 10. In another embodiment, the proxy server 20 should have a mirror image of the user profile database in the server 10. Any update to the user profile database should be reflected in both the server 10 and the proxy server 20. It should be noted that the server 10 can serve as a server and a proxy server.

Each user creates a user account at the server 10 and/or the proxy server 20 by using one of the user devices, and registers all the user devices and other data in the associated user profile. A user should log onto the proxy server 20 in order to request a video program from the proxy server 20. A user profile is a collection of personal data associated with the user. A user profile should include some or all of the following set of information:

- Number of user devices
- The type and model of each user device
- The bandwidth requirement for each user device
- Which one of the user devices is the standalone user device and its location
- Threshold distance between a handheld user device and the standalone user device
- Priority of the handheld user devices
- If more than one handheld user devices, whether to send information related to a requested video program to more than one user device
- Demographic and psychographic data including age, gender, interest graph metrics, and viewing patterns.

As listed above, the location information of a standalone user device 31 can be set by the user and stored in the user profile associated with a user account of the user because normally the standalone user device does not move a lot. In one embodiment, the standalone user device can also equipped with a positioning system, such as global positioning system (GPS), and reports its location to the proxy server 20 periodically or when moved from one location to another. The location information of a handheld user device, such as the user device 33, is sent by the handheld user device. The processor 29 invokes the distance determination module 23 to determine the distance between the standalone user device 31 and the wireless handheld user device 33 according to obtained location information of the two user devices.

As will be discussed below, the processor 29 should select one of the user devices according to whether the distance is above the threshold distance stored in the user profile, which can be set by the user.

The processor 29 may receive user view change information from each user device, preferably from user devices that are involved in the same video session. All the user devices in a user account are involved in a video session if one of the user devices requests a video program from the proxy server 20. A view change information signal may indicate that the user view is switched to the user device sending the view change information signal in one embodiment, or away from the user device sending the view change information signal in another embodiment. In yet another embodiment, the view switching indication of a view change information signal can be included in the signal itself or set in the user profile. According the principles of the embodiment, the processor 29, in response to a view change information signal, invokes the bandwidth allocation and adjustment module 24 to adjust bandwidth allocations such that the user device having the user view receives the content having the maximum quality allowable by the available bandwidth of the proxy server 20, even though the quality of content received by the user device not having the user view may be degraded.

Information related to a video program may include both images and texts. Both types of the information related to the video program can be sent to a wireless handheld user device or a standalone user device. If there are more than one wireless handheld user devices in the same account, the user can set in the user profile whether the user wants the two types of information to be sent to two different user devices according to the priority information in the user profile. The higher priority one should receive the image portion of the information related to the video program and the lower priority one should receive the text portion of the information related to the video program. For example, if a user account includes a standalone user device and two wireless handheld user devices and the standalone user device sends a request for a video program, the proxy server 20 should determine that the standalone user device should receive the requested video program, and the higher priority wireless handheld user device should receive both portions of the information related to the video program, if the user profile indicates that the user does not want different types of the information related to the video program transmitted to different user devices. However, if the user indicates in the user profile that the user wants different types of the information related to the video program transmitted to more than one device, the proxy server 20 should send the image portion of the information related to the video program to the higher priority handheld user device and the text portion of the information related to the video program to the lower priority handheld user device. If there are more than two types of the information related to the video program, similar rules should be applied.

In lieu of the priority information entered by a user, the proxy server 20 may collect view patterns and interest graph metrics and decide the priority of the user devices automatically.

It is noted that when the processor 29 receives a request for a video program, the processor 29 first checks if a copy exists in the cache 28. If a copy of the video exists in the cache 28, the processor 29 retrieves the video program from the cache 28 and sends the retrieved video program to the user devices. If the processor 29 cannot find a copy of the requested video program in the cache 28, the processor 29 requests a copy from the server 20 and stores a copy in the cache 28. Along with the video program, the cache 28 may also store a copy of the information related to the video program. Note that even if a copy of the video program exists in the cache 28, the processor 29 may still fetch updated information related to the video program from the server 20.

In an exemplary embodiment, since the proxy server 20 has finite bandwidth to serve all the users, the proxy server 20 may not have sufficient bandwidth to serve a request and in this case, the processor 29 may invoke the bandwidth allocation and adjustment module 24 to allocate bandwidth to the user device receiving the video program and the user device receiving the information related to the video program. Each type and/or model of user device may have different bandwidth requirement and the bandwidth requirement for each registered user device may be stored in the corresponding user profile or automatically determined by the processor 29 according to the type and/or model of the user device, as stored in the user profile in this embodiment.

For each request, once determining the user devices for respectively receiving the video program and the information related to the video program, the processor 29 invokes the bandwidth allocation and adjustment module 24 to allocate bandwidth to the user devices. According to the principles of the embodiment, if the available bandwidth of the proxy server 20 is insufficient, the processor 29 may invoke the content adaptation module 22 to transform the video program and/or the information related to the video program in order to satisfy the lesser allocated bandwidth. The transformation for video may involve down sampling, reducing frame rate, or if in scalable form, skipping some enhanced layers, and the transformation for information related to the video program may involve down sampling images included in the information related to the video program.

In one embodiment, when a user has logged onto the proxy server 20, the proxy server 20 polls each user device under the same user account periodically. If a user device responds to the poll, the proxy server determines that the user device is active. Otherwise, the proxy server determines that the user device is inactive. A user device is inactive if the user device has been powered down or is in a state, normal or abnormal, in which the user device cannot respond to a poll.

According to the status of each user device in a user account, the proxy server 20 may decide which ones of the active user devices are to receive the requested video program and/or information related to the video program according to the priority information stored in the user profile data base.

Figure 2:
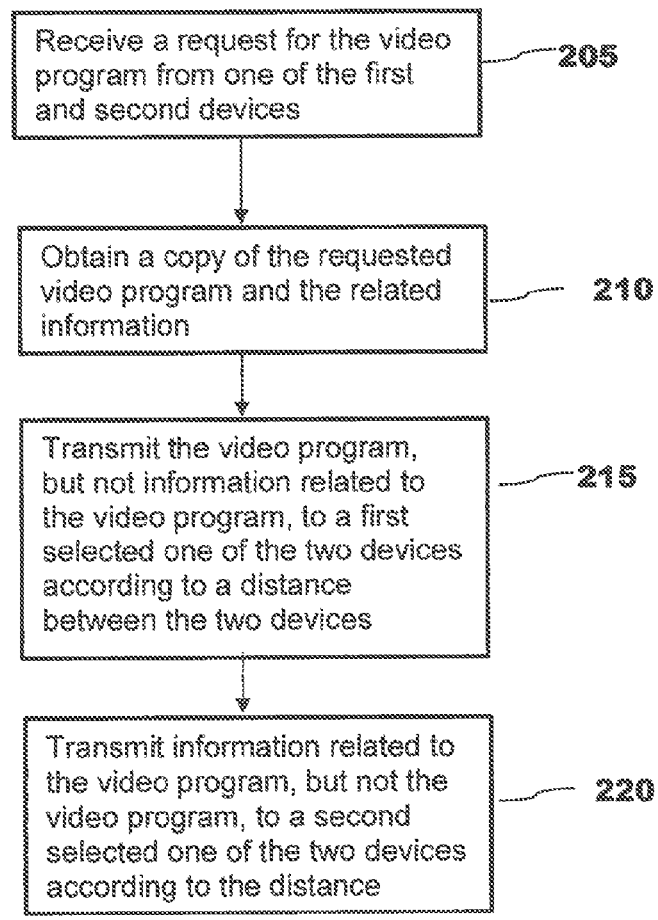
FIG. 2 shows an exemplary process of the proxy server in FIG. 1 for distributing a video program to a user having a standalone device and a handheld device.

FIG. 2 illustrates a process flow 200 of the proxy server 20 for distributing a video program to a user having first and second devices, for example, the standalone user device 31 and the wireless handheld user device (mobile phone in the embodiment) 33, according to the principles of the embodiment. Both user devices are registered in the same user account at the proxy server 20 and are assumed to be active.

At step 205, the proxy server 20 receives a request for a video program from a user using one of first and second devices. In the following illustration, the standalone user device 31 and the wireless handheld user device 33 are illustrated as the first and second devices, respectively. The user must have logged onto the proxy server 20 by, for example, entering a user name and the password.

At step 210, the proxy server 20 obtains a copy of the requested video program and the information related to the video program. In the process of obtaining a copy of the requested video program, the proxy server 20 checks whether a copy of the requested video program exists in cache 28. If it does, the cache 28 should also have a copy of information related to the requested video program ("the related information"). If the requested video program is not in the cache 28, the proxy server 20 requests a copy of the video program and a copy of the related information from the server 10. Note that even if a copy of the related information exists in the cache 28, the proxy server 20 may still request a copy of the related information from the server 10 because the copy in the cache 28 may not be up-to-date.

At step 215, the proxy server 20 selects a first one of the standalone user device 31 and the wireless handheld user device 33 to receive the video program according to at least the distance between the two user devices and transmits the video program to the first selected one user device. At step 220, the proxy server 20 selects a second one of the two user devices according to the distance and transmits the related information to the second selected one of the standalone user device 31 and the wireless handheld user device 33. As illustrated below, the first selected one user device may be the same or different from the second selected one user device.

According to the principles of the embodiment, the proxy server 20 selects the first selected one user device according to the distance between the wireless handheld user device 33 and the standalone user device 31. The proxy server 20 may obtain the location information of the wireless handheld user device 33 by, for example, requesting the wireless handheld user device 33 for the location information on a as needed basis or monitoring location information sent from the wireless handheld user device 33, which, when active, may automatically and periodically, for example every 20 seconds, sends its location information to the proxy server 20. The location information of the standalone user device 31 should be set by the user in the user profile and can be obtained by the proxy server 20 by retrieving the information in the user profile. The location set by the user in the user profile can be just a street address and the proxy server 20 should be able to retrieve the building location based on the street address. In this embodiment, the proxy server 20 should use the center of the building associated with the street address as the location of the standalone user device 31. In another embodiment, a user may use a Global Positioning System (GPS) to find the latitude and longitude of the standalone user device 31 and transmits that location information to the proxy server 20 for entering into the corresponding field in the user profile. In yet another embodiment, the standalone may include a positioning device and is able to send its location information to the proxy server 20 automatically or upon request by the proxy server 20. The proxy server 20, thus, can determine the distance between the wireless handheld user device 33 and the standalone user device 31 according to the location information for the standalone user device 31 and the location information received from the wireless handheld user device 33.

In another embodiment, a wireless handheld device can determine the distance to the standalone device and report the distance to the proxy server 20. For example, when the wireless handheld device is able to connect to the standalone device through a wireless connection, for example Bluetooth, the wireless handheld device reports that the distance is within the predefined threshold and if not, the wireless handheld device reports that the distance is greater than the predefined threshold. A standalone device may to the same as well. In yet another embodiment, a standalone device may be equipped with two cameras and determines the distance of the user using the two views, and report the measured distance as the distance between the two devices.

If the distance is less than a predefined threshold, for example, 30 feet, the standalone user device 31 is selected as the first selected one user device to receive the video program and the wireless handheld user device 33 is selected as the second selected one user device to receive the related information. In effect, the proxy server 20 transmits the video program to the standalone device 31 and the related information to the wireless handheld user device 33. Thus, the first selected one user device is different from the second selected one user device.

If the distance is greater than the predefined threshold, the proxy server 20 selects the wireless handheld user device 33 as the first and second selected one user devices, and transmits both the video program and the related information to the wireless handheld user device 33, and no video program and no related information to the standalone user device 31. Thus, the first selected one user device is the same as the second selected one user device.

In one embodiment, if the proxy server 20 fails to obtain the location information for either or both user devices, the proxy server 20 determines that the distance is greater than the threshold. The proxy server 20 attempts to obtain location information repeatedly and if the proxy server 20 cannot obtain the location information within a predefined period, for example, one minute, the proxy server 20 determines that it fails to obtain the location information.

In another embodiment, the selection of the selected first and second one user devices may depend on which one of the two user devices transmits the request for the video program. If the request is transmitted by the wireless handheld user device 33, the selection is as described above. If the request is transmitted from the standalone user device 31, the selection when the distance is less than the predefined threshold is the same as described above. However, if the distance is greater than the predefined threshold and the request is transmitted from the standalone user device 31, the proxy server 20 selects the standalone user device 31 as both the first and second selected one user devices. The assumption is that if the request is sent by the standalone user device 31, the user should be near the standalone user device 31 and the wireless handheld user device 33 should be nearby as well. If the wireless handheld user device 33 is not nearby, it is assumed that the user left it somewhere inadvertently, for example, forgetting to bring the wireless handheld user device 33 after visiting a friend, forgetting to turn the wireless handheld user device on, or having a broken wireless handheld user device. In these circumstances, the proxy server 20 should determine that the distance is greater than the predefined threshold and should select the standalone user device 31 as both the first and second selected one user devices.

If the distance is greater than the predefined threshold and the request is transmitted from the wireless handheld user device 33, the proxy server 20 selects the wireless handheld user device 33 as both the first and second selected one user devices. The assumption is that since the user uses the wireless handheld user device 33 to send the request, the user should be using the wireless handheld user device 33.

The predefined threshold can be entered by the user and stored in the threshold distance field in the exemplary user profile, discussed above. The proxy server 20 may allow a user to change this threshold and location information for the standalone user device 31.

The user device that receives both the video program and the related information may provide split screens, such as two windows, for displaying the video program and the related program information, or provide an option for the user to see either one at a given moment.

As stated above, both user devices are assumed to be active. In one embodiment, the processor 20 determines status of each of the standalone user device and the wireless handheld device; if both user devices are not active, the processor 20 terminates transmissions of the video program and the related information; if both user devices are active, the processor 20 maintains transmissions of the video program and the related information; and if only one user device is active, the processor 20 transmits both the video program and the related information to the active user device, and no video program and no related information to the inactive user device. This embodiment can be applied to cases where more than two user devices are involved with the consideration of the priority information. The example of considering the priority is given later in one of the embodiments.

In one embodiment, the related information may be classified into two or more types with different priorities, and each type is sent to a corresponding user device with corresponding priority. For example, the related information may be classified into graphics (images) and texts with graphics having a higher priority. The standalone user device should be considered having the highest priority. In one embodiment, the user can set priority for each handheld user device in the user profile. In the following, we assume that the user assigns a higher priority to the wireless handheld user device 33 than that of the wireless handheld user device 32. If both wireless handheld user devices are within the predefined distance threshold and the video is transmitted to the standalone user device 31, the graphics portion is sent to the wireless handheld user device 33 and the text portion is sent to the wireless handheld user device 32. In another embodiment, if a wireless handheld user device sends the request for the video program, the wireless handheld user device becomes the highest priority wireless handheld user device. For example, if the wireless handheld user device 32 has lower priority than the wireless handheld user device 33 but the wireless handheld user device 32 is the one that sends the request, the wireless handheld user device 32 should be treated as having higher priority than the wireless handheld user device 33. In this scenario, if the related information is sent to the wireless handheld user devices 32 and 33, the graphics or images should be sent to the wireless handheld user device 32 and the texts to the wireless handheld user device 33.

Figure 3:
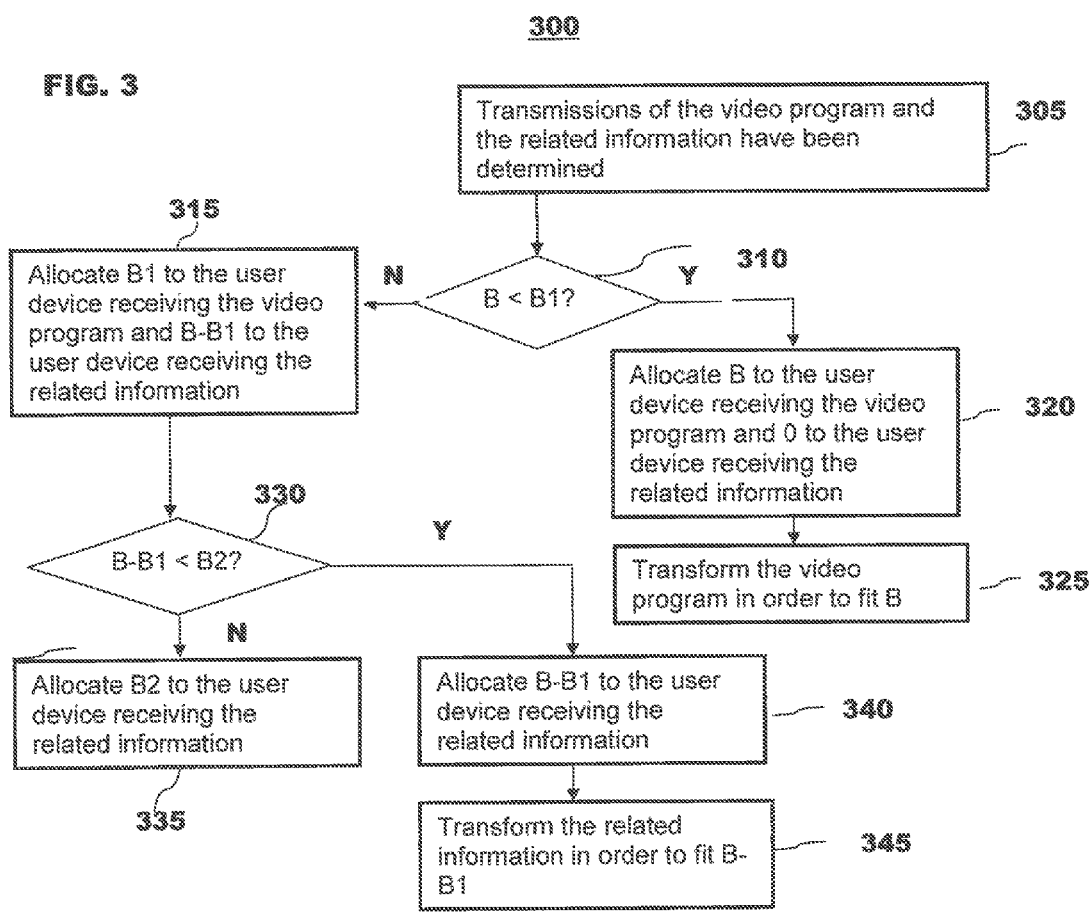
FIG. 3 shows an exemplary process for allocating, by the proxy server, bandwidth to user devices respectively receiving the video program and the information related to the video program according to bandwidth available at the proxy server.

In another aspect of the principles of the embodiment, the proxy server 20 has finite bandwidth to serve all users and adapts or transforms a video program and/or the related information if the available bandwidth is not sufficient to satisfy the bandwidth requirement for the video session. It should be noted that each type of user device may have a different bandwidth requirement. Assuming that the available bandwidth of the proxy server allocated to a user requesting a video program is B and the bandwidth requirement of the user device receiving the video program is B1 and the bandwidth requirement of the user device receiving the related information is B2, FIG. 3 shows an exemplary process 300 for allocating bandwidth to user devices and adapting the content, which may be the video program, the related information, or both, as necessary, which are performed by the bandwidth allocation and adjustment module 24 and the content adaptation module 22. At step 305, the proxy server 20 has determined which user devices to receive the video program and the related information in a new video session, for example, as shown in FIG. 2, or when the distance between the two user devices becomes more than the predefined distance threshold in an existing video session. When the distance is greater than the predefined threshold, as illustrated above, one user device is receiving both the video program and the related information and the other does not receive both. Again, the example of two user devices is illustrated here.

At step 310, the proxy server 20 checks if the available bandwidth B is less than the bandwidth requirement B1 of the user device receiving the video program. If B is not less than B1, the process proceeds to step 315, in which the proxy server 20 allocates B1 to the user device receiving the video program and B−B1 to the user device receiving the related information. At step 330, the proxy server 20 checks if B−B1 is less than B2 (the bandwidth requirement of the user device receiving the related information). If B−B1 is not less than B2, the proxy server 20 allocates B2 to the user device receiving the related information at step 335.

If B−B1 is less than B2 as determined at step 330, the proxy server 20 allocates B−B1 to the user device receiving the related information at step 340. At this point, the content adaption module 22 may be invoked to transform the related information, such as downsizing by, for example, reducing the resolution of the related information to satisfy B−B1 at step 345. For example, if the related information includes images, the resolutions of the images may be reduced or the images are not transmitted.

If B is less than B1 as determined at step 310, the proxy server 20 allocates B to the user device receiving the video program and nothing to the user device receiving the related information at step 320 and, at step 325, the proxy server 20 invokes the content adaption module 22 to adapt or transform the video program to satisfy B. The transformation or adaptation can be accomplished, for example, by down sampling, spatially or temporally or both, the video program and or if the video program is a scalable video, skipping sending some higher layer data. Down sampling should result in lower resolution spatially or temporally. Any transformation or adaption of content as used herein results in content having quality worse than the initial quality of the content. For example, if the initial resolution of a video program is 1280×1024 pixels, an adaption or transformation, may result in lower resolution, such as 1024×786 or 800×600. The video program having the resolution of 1280×1024 has a better quality than the video program having the resolution of 1024×786, which has a better quality than the video program having the resolution of 800×600.

Although illustrating as using one standalone user device and one wireless handheld user device, the same principles of the embodiment can be applied to one standalone user device and more than one wireless handheld user devices. For example, if the related information includes both images and texts. The image portion can be sent to one user device not receiving the video program and the text portion to another wireless user device not receiving the video program. If no sufficient bandwidth after allocating bandwidth to the user device receiving the video program, the remaining available bandwidth is first allocated to the user device that receives the image portion and, if more left, the remainder is allocated to the user device that receives the text portion. Again if the allocated bandwidth is not sufficient to satisfy the bandwidth requirement of a user device, the content to be sent to that user device should be adapted or transformed to satisfy the allocated bandwidth.

According to another aspect of the principles of the embodiment, if the video program and the related information are sent to two different user devices, the proxy server 20 may obtain view or view change information of the user and adjust qualities of the video program and the related information accordingly. The idea is to give the best quality of content transmitted to the user device having the user view according to the view change information by allocating maximum amount of bandwidth to the user device having the user view. The maximum amount should not exceed the available bandwidth at the proxy server 20 and the bandwidth requirement of the user device having the user view. Maximizing quality of the content transmitted to the user device having the user view may result in worsening quality of the content transmitted to the other user device that does not have the user view because the bandwidth allocated to the user device not having the user viewed may be reduced.

Figure 4A:
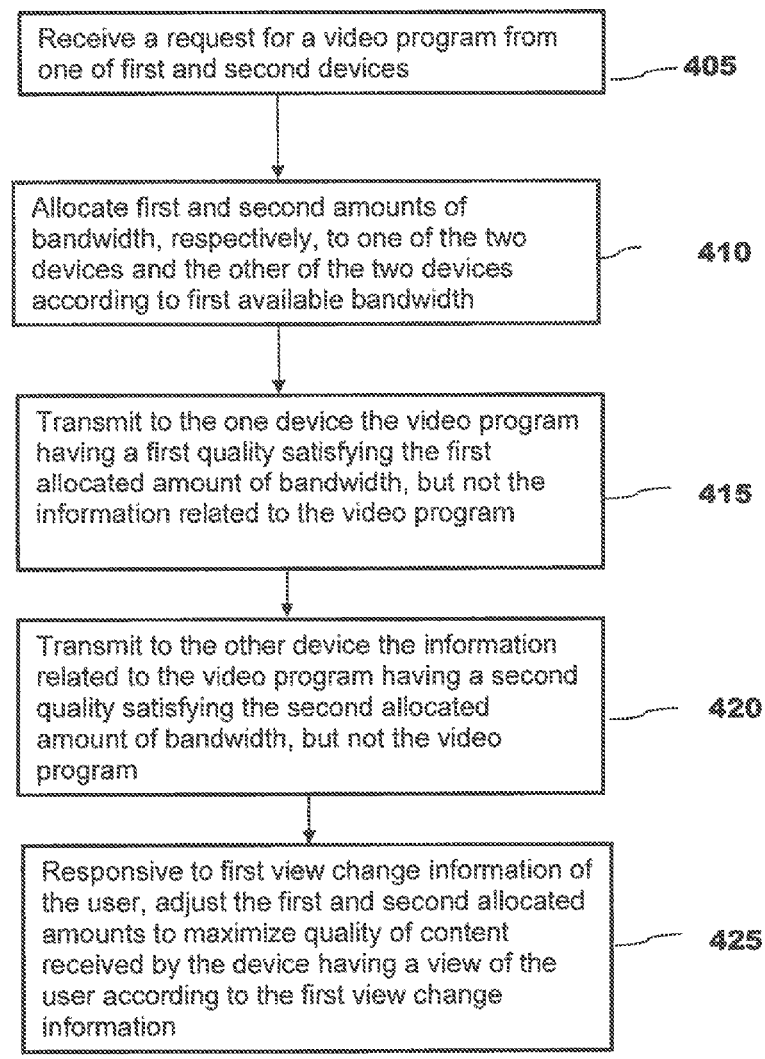

FIG. 4A illustrates a process 400 for adjusting bandwidth for first and second devices registered in an account according the user view. As mentioned above, adjusting bandwidth should result in maximizing quality of content received by the device having the user view and may result in degradation of quality of content received by the device not having the user view.

At step 405, the proxy server 20 receives a request for a video program from one of the two devices. In the following illustration, the standalone device 31 and the wireless handheld user device 33 are illustrated as the first and second devices, respectively.

At step 410, the proxy server 20 allocates first and second amounts of bandwidth respectively to one of the two user devices and the other of the two user devices according to first bandwidth available at the proxy server 20. The allocation can be performed, for example, according to the process illustrated in FIG. 3.

At step 415, the proxy server 20 transmits the video program having a first quality, but not the related information, to the one user device and at step 420, transmits the related information having a second quality to the other user device.

If the allocated bandwidth for a user device to receive content, which can be the video program, the related information, or both, is greater than the bandwidth requirement of the user device, the content should be transmitted with its initial quality without having to transform the content to reduce the size and thus the quality. However, if the allocated bandwidth is less than the bandwidth requirement, the content should be transformed to reduce the size to satisfy the allocated bandwidth, resulting in a quality worse than the initial quality.

For example, if the first allocated amount is greater than a bandwidth requirement of the one user device, the first quality is the initial quality of the video program and if the first allocated amount is less than the bandwidth requirement of the one user device, the first quality is worse than the initial quality of the video program. This is also true for the related information. If the second allocated amount is greater than a bandwidth requirement of the other user device, the second quality is the initial quality of the related information and if the second allocated amount is less than the bandwidth requirement of the other user device, the second quality is worse than the initial quality of the related information.

Transformation of content having an initial quality can be done by reducing the size of the content, for example, reducing the resolution, spatially or temporally.

At step 425, the proxy server 20 adjusts the first and second allocated amounts to maximize quality of content received by the user device having a view of the user according to first view change information of the user. This idea is to provide the user the best quality of content transmitted to the user device having the user view.

FIG. 4B illustrates the details of the step 425. At step 4251, the proxy server 20 determines which user device has the user view according to the first view change information. The first view change information may indicate that the user view is switched to the user device sending the first view change information (the sending user device) in one embodiment or away from the sending user device in another embodiment. If the first view change information indicates that the user view is switched to the sending user device, the sending user device has the user view after sending the first view change information. If the first view change information indicates that the user view is switched away from the sending user device, the sending user device loses the user view after sending the first view change information and the other user device is determined to have the user view. In this embodiment, the two user devices are under the same user account and are in the same video session. The sending user device is in a video session, if the sending user device should receive either a video program or the related information. If a user device not in a video session can send view change information, the proxy server 20 may check if the sending user device is in a video session and if the sending device is not in a video session, the proxy server 20 takes no further action in response to receipt of the view change information.

At step 4252, the proxy server 20 checks whether the allocated amount of bandwidth ("BW") is less than the BW requirement of the user view according to the first view change information. If it is not less than the bandwidth requirement, the proxy server 20 adjusts the first and second allocated amounts by maintaining the first and second allocated amounts at step 4253 and the process proceeds to adjust qualities of contents transmitted to the two user devices respectively according to the adjusted amounts. Since the first and second allocated amounts are maintained, the proxy server 20 adjusts the qualities by maintaining the first and second qualities. The process then proceeds to receive new view change information.

If the allocated amount to the user device having the user view is less the bandwidth requirement of the user device having the user view, the proxy server 20 adjusts the first and second allocated amounts by increasing the allocated amount to the user device having the user view and reducing the allocated amount to the user device not having the user view at step 4254. At step 4255, the proxy server 20 adjusts the qualities of contents transmitted to the two user devices respectively according to the adjusted amounts. The process then proceeds to receive new view change information and then back to step 4251.

The step of adjusting qualities comprises if the adjusted allocated amount to the user device having the user view is not less than the bandwidth requirement of the user device having the user view, transmitting content having the initial quality to the user device having the user view; and if the adjusted allocated amount to the user device having the user view is less than the bandwidth requirement of but more than the allocate amount to the user device having the user view, transforming the content having the initial quality into the content having a third quality to satisfy the adjusted allocated amount to the user device having the user view, the third quality being better than the first quality. As such, the quality of content to the user device having the user view is maximized.

Since the adjusted allocated amount for the user device not having the user view is reduced at step 4254, the quality of the content transmitted to the user device not having the user view is also adjusted at step 4255. The adjustment can be done, for example, by transforming the content having the initial quality or quality currently transmitting into the content having a third quality to satisfy the reduced bandwidth. The third quality should be worse than the initial quality or the quality previously used in the transmission of the content because of the transformation.

It is possible that the proxy server 20 may receive second view change information from the user device not sending the first view change information after receiving the first view change information and no view change information is received between the first and the second view change information. In this scenario, the proxy server 20 may restore the first and second allocated amounts because the user view is switched back to the same user device before receiving the first view change information.

In one embodiment, the proxy server 20 may determine again the bandwidth available (the second available bandwidth) at the server in response to a view change information signal. In this embodiment, the proxy server 20 adjusts the first and second allocated amounts according to the second available bandwidth (the newly determined available bandwidth at the proxy server 20). For example, the proxy server 20 allocates a third amount of bandwidth to maximize quality of content transmitted to the user device having the user view according to the second view change information; and a fourth amount of bandwidth according the second available bandwidth and the third amount. The third amount should not be more than the second available bandwidth and the bandwidth requirement of the user device having the user view according to the second view change information. Since the quality is maximized, the third amount should be the maximum allowable by the second available bandwidth up to the bandwidth requirement of the user device having the user view. The proxy server 20 may apply similar principles responsive to the first view change information.

In response to view change information, the proxy server 20 may allocate the entire available bandwidth to the user device having the user view to maximize the quality of the content received by the user device having the user view. As a result, the proxy server 20 transmits no content supposed to be transmitted to the user device not having the user view. In this scenario, if the user view is switched back to the user device not having the user view, the user device not having the user view previously should receive the content having equal or better quality according to the newly allocated amount of bandwidth.

Assume that the standalone user device 31 is receiving the video program but not the related information, the wireless handheld user device 33 is receiving the related information, but not the video program, and the wireless handheld user device 33 detects that the user switches the view to the wireless handheld user device 33 and transmits the first view change information to the proxy server 20. The wireless handheld user device 33 should receive the related information having at least the same quality than that received before sending the first view change information. If after the adjustment, the standalone user device 31 detects that the user has switched the view back and sends second view change information to the proxy server 20, the proxy server 20 should restore the allocated amounts to the amounts before receiving the first view change information or reallocate the amounts according to the newly determined available bandwidth at the proxy server 20 responsive to the second user view change information.

Although two different user devices are illustrated, the principles of the application can be applied to three or more user devices. For example, if the standalone user device 31, the wireless handheld user device 32, and the wireless handheld user device 33 are involved in a video session. Assume that the standalone user device 31 is receiving the video program, the wireless user devices 32 and 33 are respectively receiving the text portion and graphics portion of the related information. At this point, the proxy server 20 receives view change information and determines that the wireless user device 32 has the user view. The proxy server 20 should adjust the allocated amount of bandwidth as follows: increasing the allocated amount for the wireless handheld user device 32 and allocating the remaining bandwidth between the wireless handheld user device 33 and the standalone user device 31. Since the video program is considered having higher priority than the graphics, the remaining bandwidth is first used to satisfy the bandwidth requirement of the standalone user device 31 and the leftover is then allocated to the wireless handheld user device 33. Normally, in this embodiment, the video program has a higher priority over the graphic portion of the related information, which has a higher priority over the text portion of the related information. However, the content transmitted to the user device having the user view should assume the highest priority content. As such, the bandwidth is allocated first to satisfy the bandwidth requirement for the user device receiving the highest priority content, which should be the user device having the user view, the remainder of the available bandwidth is then allocated to satisfy the bandwidth requirement of the user device receiving the next highest priority content, which should be a user device not having the user view, the remainder of the remainder is then allocated to satisfy the user device receiving the second next highest priority content, which should be a user device not having the user view, and so on and so forth. Thus, according to the principles of the embodiment, the bandwidth is allocated or adjusted according to the priority of content received by a user device in this embodiment.

If three user devices, for example, the standalone user device 31, the wireless handheld user device 32, and the wireless handheld user device 33, are involved in a video session, and the view change information indicates that the user view is switched to the sending user device, the proxy server 20 determines that the sending user device has the user view. However, if the view change information indicates that the user view is switched away from the sending user device, the proxy server 20 determines that the user view is on the user device not sending the view change information, which receives the higher priority content, and not on the user device not sending the view change information, which receives the lower priority content.

In one embodiment, the proxy server 20 may periodically check the status of each user device involves in a video session. If both user devices are not active, the proxy server 20 terminates transmissions of the video program and the related information; and if only one user device is active, the proxy server 20 transmits both the video program and the related information to the active user device. In case, more than two user devices, three for illustration purpose, are involved, if all user devices are active, no action is needed. If only one is active, both the video program and the related information are transmitted to the active user device. If only two are active and the inactive one was receiving the video program, the higher priority one of the two active user devices receive the video program and the other receives the related information. If the inactive one was receiving a portion, such as graphic or text, of the related information, the active one, which is receiving the other portion of the related information, should also receive the portion of the related information, i.e., the active one receiving both portions of the related information.

In another embodiment, the proxy server 20 may periodically check the distance between the wireless handheld user device and the standalone user device. If the distance is within the predefined threshold, the proxy server 20 adjusts the first and second allocated amounts as described above. If the distance is not within the predefined threshold, the adjusting step comprises allocating the first available bandwidth to satisfy bandwidth requirement of the user device having the user view and transmitting the video program and the related information to the user device having the user view, and allocating no bandwidth to the user device not having the user view and transmitting no video program and no related information to the user device not having the user view. If in a later time, the proxy server 20 determines from second view change information that the user device not having the user view ("the other user device") now has the user view, the proxy server 20 allocates available bandwidth to satisfy the bandwidth requirement of the other user device and transmits both the video program and the related information to the other device. The proxy server 20 allocates no bandwidth and no video program and the related information to the user device previously having the user view before the proxy server 20 has received the second view change information.

If three user devices are involved and both handheld user devices are not within the predefined distance threshold, the proxy server 20 allocates the available bandwidth to satisfy the bandwidth requirement of the user device having the user view, and transmits both the video program and the related information to the user device having the user view, and allocates no bandwidth and transmits no video program and no related information to the other two user devices not having the user view. Thus, response to any view change information, only the user device having the user view gets the bandwidth and receives the video program and related information. If only one handheld user device (the in-range handheld user device) is within the predefined threshold distance and if the other handheld user device (the out-of-range handheld user device) has the user view, the proxy server 20 allocates the available bandwidth to bandwidth to satisfy the bandwidth requirement of the out-of-range handheld user device having the user view, and transmits both the video program and the related information to the out-of-range user device having the user view, and allocates no bandwidth and transmits no video program and no related information to the other two user devices not having the user view. However, if the out-of-range handheld user device does not have the user view, the proxy server 20 adjusts the bandwidth between the in-range handheld user device and the standalone user device according to user view information as described above with respect to the embodiment of two user devices in a video session and the content received by the out-of-range handheld user device is now transmitted to the in-range handheld user device and the standalone user device according to, for example, the distribution portion of the process 200 in FIG. 2. If at a later time, the proxy server 20 receives second view change information and determines that the out-of-range handheld user device has the user view, the proxy server 20 allocates the available bandwidth to satisfy the bandwidth requirement of the out-of-range handheld user device, and transmits both the video program and the related information to the out-of-range user device having the user view, and allocates no bandwidth and transmits no video program and no related information to the other two user devices not having the user view. If the proxy server 20 determines from the second view change information that one of the in-range handheld user device and the standalone user device has the user view, the adjustment is done according to the two user device embodiment, as described previously.

A user device may detect a view change from a user in conventional manners, such as tracking head orientations, eye movements using one or two cameras, detecting input from an input element, or detecting a touch on the display that is touch sensitive. A user device in this embodiment sends view change information to the proxy server 20 when it detects that the view of the user is switched to or away from the user device. In order to prevent a false view change or changing qualities of a video program and the related information too often, a user device may send a view change information signal after detecting that no new view change in a predefined interval, for example, 10 seconds, after detecting the view change.

Figure 5:
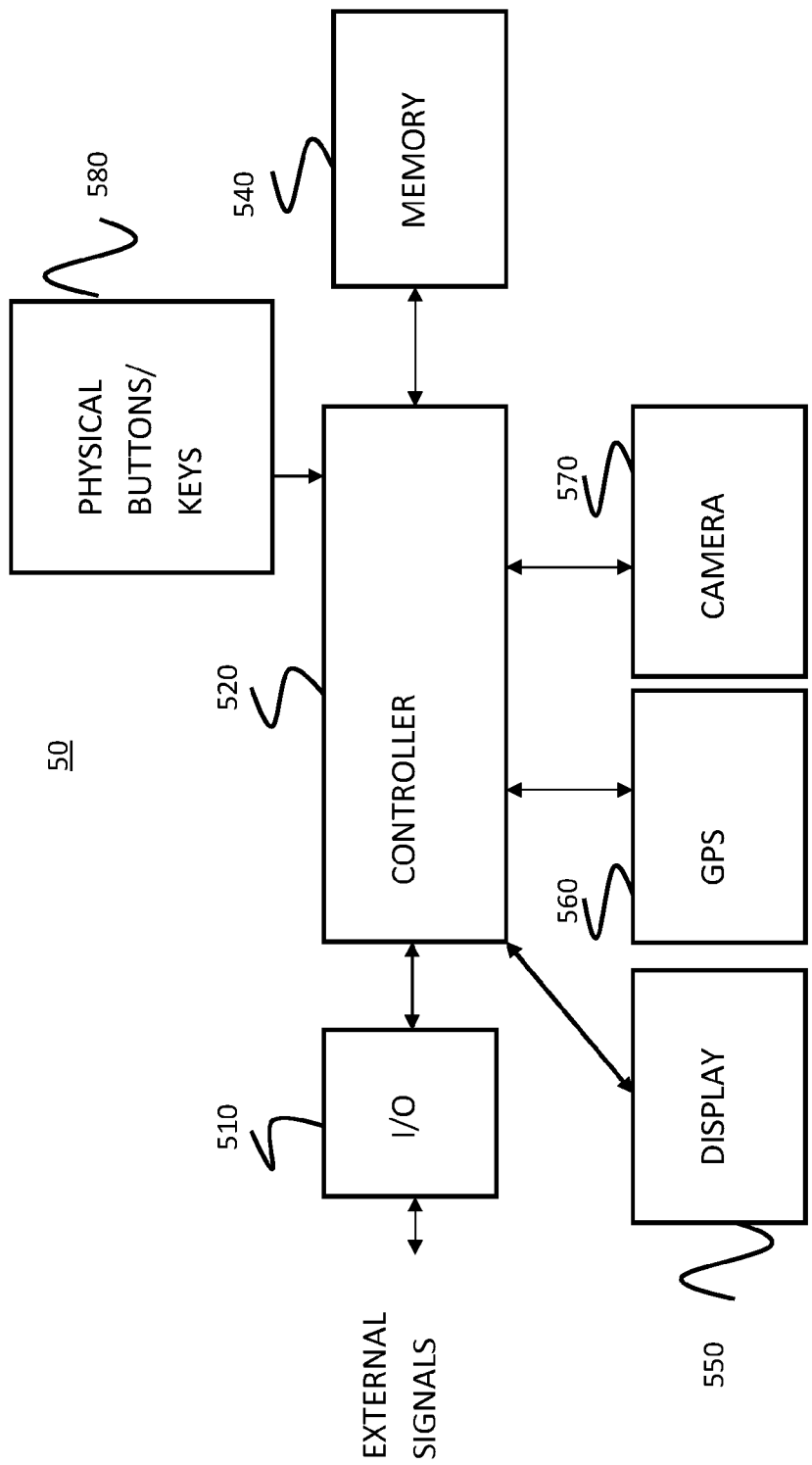
FIG. 5 shows an exemplary user device suitable for use in the exemplary embodiments of the present invention.

FIG. 5 illustrates a user device 50, which is an exemplary embodiment for the user devices 31, 32, and 33. The user device 50 comprises input/output (I/O) means such as I/O block 510, control and processing means such as controller 520, user input means such as physical buttons/keys block 580, data storage means such as memory 540, display means such as display 550, positioning means such as GPS 560 (optional for the standalone user device 31), user view detecting means, such as camera 570. Some of the foregoing elements of FIG. 5 may be embodied using one or more integrated circuits (ICs). For clarity of description, certain conventional elements associated with user device 50 such as certain control signals, power signals, and/or other elements may not be shown in FIG. 5.

The I/O block 510 is operative or configured to perform I/O functions of user device 50. According to an exemplary embodiment, I/O block 510 is operative or configured to receive signals such as audio, video and/or data signals in a digital modulation format(s) in a wired and/or wireless manner from one or more networks such as cell phone, internet (such as the networks 41 and 43) and/or other network sources, and to output signals in a wired and/or wireless manner to such one or more networks. I/O block 510 may be embodied as any type of I/O interface capable of receiving wired and/or wireless signals, and may be comprised of one or more individual components (e.g., antenna(s), plug(s), etc.).

The controller 520 can be a single processor or a plurality of individual similar or different processors. The controller 520 is operative or configured to perform various signal processing and control functions (e.g., execute software code, etc.) of user device 50 that facilitates and enables performance of the various embodiments and techniques of the present invention described herein.

According to an exemplary embodiment, the controller 520 receives the signals provided from I/O block 510 and performs and/or enables all necessary processing and control functions associated with user device 50 via one or more microprocessors and/or other element(s). For example, the controller 520 is operative or configured to process audio, video and/or data signals provided from I/O block 510 by performing functions including tuning, demodulation, forward error correction, and transport processing functions to thereby generate digital data representing audio, video and/or data content. The digital data produced from such processing functions may be provided for further processing and/or output (e.g., via display 550).

Also according to exemplary embodiments, controller 520 is operative or configured to perform and/or enable various other functions including, but not limited to, processing user inputs made via physical buttons/keys block 580, controlling functions (e.g., volume and channel control functions, etc.) of user device 50 in response to user inputs, reading and writing data from and to memory 540, enabling on-screen displays (e.g., video, virtual buttons/keys, menus, etc.) via display 550, and/or other operations as may be described herein.

Physical buttons/keys block 580 is operative or configured to receive physical user inputs from a user operator of user device 50. According to an exemplary embodiment, physical buttons/keys block 580 comprises a plurality of physical buttons and/or keys that are arranged in a symmetrical and/or other suitable manner around display 550, and may for example, be configured within and extend from a housing of user device 10. Other types of inputs may also be provided via display 550.

Memory 540 is operatively coupled to controller 520 and performs data storage functions of user device 50. According to an exemplary embodiment, memory 540 stores data including, but not limited to, software code and other data associated with one or more computer applications including those described herein, on-screen display data (e.g., virtual buttons/keys, menus, browsers, etc.), user selection/setup data, and/or other data.

Display 550 is operative or configured to provide visual displays including video content pursuant to the control of controller 520. According to an exemplary embodiment, display 550 is operative or configured to provide touch-screen capabilities including virtual buttons/keys, and thereby enables a user operator to provide inputs (separate from those provided via physical buttons/keys block 580) that are received and processed by controller 520. Display 550 may be embodied using any type of suitable display device, such as a light emitting diode (LED) display, liquid crystal display (LCD), or other type of display device.

Camera 570 is operative or configured to form an image of an object within its focus area and stores a copy of the image in the memory 540. In one embodiment, the image is an image including the head portion of the user. Since the location of the camera 570 in the user device 50 is fixed, the processor 520 is able to detect from the head image whether the view of the user is switching to or away from the user device 50 using conventional methods. In one embodiment, the user device 50 may include a second camera (not shown), so that the processor 520 can more accurately determine a user view change. Once the processor 520 has detected a user view change, the processor 520 sends view change information to the proxy server 20. The view change information may indicate either the user view is switched into the user device 50 or away from user device 50.

In one embodiment, the processor 520 determines that the user view is switched into the user device 50, if the processor 520 detects a user input either from the display 550 or the physical buttons/keys 580.

The GPS 520 is operative or configured to obtain the location information of the user device 50 and the processor 520 should report the current position periodically, for example, every five seconds, or upon request by the proxy server 20. The GPS 520 is optional for a standalone user device.

Figure 6:
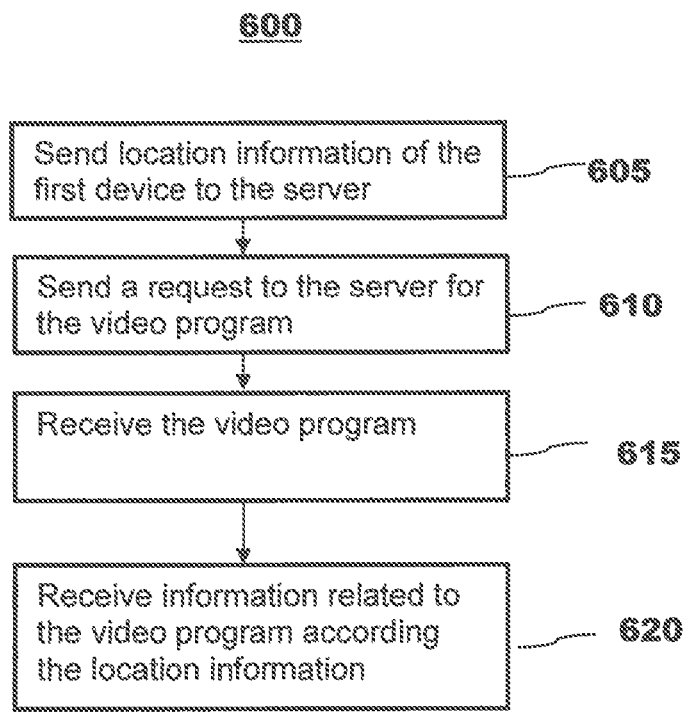
FIG. 6 shows an exemplary process of a standalone user device suitable for implementing exemplary embodiments of the present invention.

FIG. 6 illustrates a process flow 600 if the user device 50 is functioning as a standalone user device. At step 605, the processor 520 sends location information of a first device to the server 20. The first device is registered as a standalone user device and in the following illustration of the process flow 600, a standalone user device and a wireless handheld device illustrate the first device and a second device registered in the same account, respectively.

At step 610, the processor 520 sends a request to the proxy server 20 for a video program in response to a user input. At step 615, the processor 520 receives the video program from the proxy server 20. At step 620, the processor 520 receives information related to the video program (the related information) from the proxy server 20 according to the location information.

The location information of the first device is used by the proxy server 20 to determine a distance between the standalone user device and a wireless handheld user device registered under the same user account. Since the distance depends on the location information, the processor 520 receives the related information according to the distance.

For example, if there is a first wireless user device under the same user account is active, the processor of the first wireless user device should send its location information to the proxy server 20, so that the proxy server 20 can determine the distance between the standalone user device and the first wireless handheld user device. The user may set the location information of the standalone user device in the user profile via the standalone user device during the setup process or when the standalone user device has been moved. If the standalone user device is equipped with a positioning device, the standalone user device can send its location information when the standalone user device has been moved.

If the distance is less than a predefined threshold, the standalone user device, while receiving the video program, should not receive signal of the related information at the step of receiving the related information at step 615. Rather, the first wireless handheld user device should receive the related information but not the video program. If the distance is greater than the predefined threshold, the step of receiving the related information receives the related information. Thus, the standalone user device receives both the video program and the related information, and the wireless handheld user device receives no related information and no video program.

If the distance is less than the predefined threshold resulting in the standalone user device receiving the video program and the first wireless handheld user device receiving the related information and the first wireless handheld user device is moved so that the distance is now greater than the predefined threshold, two embodiments are disclosed. In the first embodiment, the standalone user device should receive both the video program and the related information if the standalone user device remains active, and the first wireless handheld user device receives no video program and no related information. The rationale is that if the user is not interested in watching the video program from the standalone user device, the user should make the standalone user device inactive, for example, by turning the standalone user device off. In the second embodiment, the standalone user device receives no video program and no related information, and the first wireless handheld user device receives both. The rationale is that the user should always bring the first wireless handheld user device when the user leaves home.

The standalone user device may also detect a view change of the user with respect to the standalone user device by analyzing images taken by the camera 570 in a conventional manner, generate view change information, and send the view change information to the proxy server 20. The view change information may indicate that the user view is switched into the standalone user device in one embodiment or away from the standalone user device in another embodiment.

If the standalone user device sends view change information indicating that the user view is switched away from the standalone user device and the distance is less than the predefined threshold, the first wireless handheld user device should receive content of equal or better quality and the standalone user device should receive content having equal or worse quality, as described previously with respect to FIG. 4B. Afterward, if the first wireless handheld user device sends a view change information indicating that the user view is switched away from the first wireless handheld user device and the distance is still less than the predefined threshold, the qualities of the contents respectively received by the standalone and the wireless handheld user devices should be restored to those before the first view change information is transmitted to the proxy server 20.

If the standalone user device sends view change information indicating that the user view is switched to the standalone user device and the distance is less than the predefined threshold, the standalone user device should receive content having equal or worse quality and the wireless handheld user device should receive content having equal or worse equality, according to, for example, the process described above with respect to FIG. 4B.

If there is a second wireless handheld user device also within the predefined threshold distance with respect to the standalone user device and the related information is allowed to be sent to more than one user device, the image (graphic) portion of the related information is received by the higher priority one of the first and the second wireless handheld user devices and the text portion is received by the other wireless handheld user device. The change of quality of content received by the standalone user device in response to the user view switching into or away from the standalone user device can be derived from the previously description related to FIG. 4B.

Figure 7:
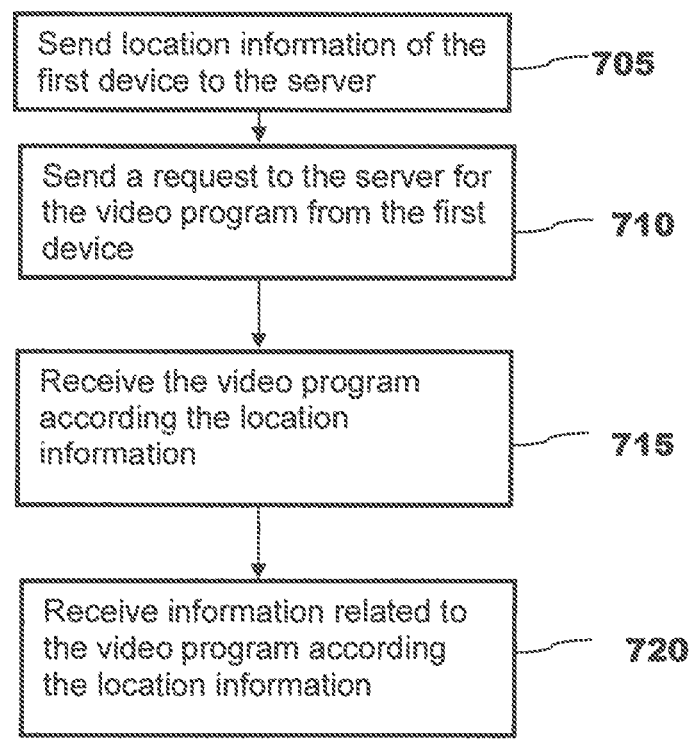
FIG. 7 shows an exemplary process of a handheld user device suitable for implementing exemplary embodiments of the present invention.

FIG. 7 illustrates a process flow 700 if the user device 50 is functioning as a first wireless handheld user device. At step 705, the processor 520 sends location information of a first device to the server 20. The first device is registered as a wireless handheld user device and in the following illustration of the process flow 700, a wireless handheld user device (the first wireless handheld user device) and a standalone user device illustrate the first device and a second device registered in the same account, respectively.

At step 710, the processor 520 send a request to the proxy server 20 for a video program in response to a user input. At step 715, the processor 520 receives the video program from the proxy server 20 according to the location information and, at step 720, the processor 520 receives information related to the video program (the related information) from the proxy server 20 according to the location information.

The location information of the first device is used by the proxy server 20 to determine a distance between the standalone user device and a wireless handheld user device registered under the same user account. Since the distance depends on the location information, the processor 520 receives the video program according to the distance and receives the related information according to the distance.

The processor 520 should send the location information of the first wireless handheld device to the proxy server 20 automatically or on request, so that the proxy server 20 can determine the distance between the standalone user device and the first wireless handheld user device.

In one embodiment, if the distance is less than a predefined threshold, the step 715 of receiving the related information receives the related information, the step 710 of receiving the video program receives no video program, and the standalone user device receives the video program but not the related information. The rationale is that the standalone device should have a bigger display and should be more comfortable for a user to view the video program.

In another embodiment, if the distance is less than a predefined threshold, the step 715 of receiving the related information receives no related information, the step 710 of receiving the video program receives the video program, and the standalone user device receives related information but not the video program. The rationale is that the use device sending the request for the video program should receive the requested video program.

If the distance is less than the predefined threshold and the first wireless handheld user device is moved so that the distance is now greater than the predefined threshold, the standalone user device receives no video program and no related information, and the first wireless handheld user device receive both. The rationale is that the user made the request from the first wireless handheld user device and should always bring the first wireless handheld user device when the user leaves home.

The first wireless handheld user device may also detect a view change of the user with respect to the wireless handheld user device by analyzing images taken by the camera 570 in a conventional manner and send view change information to the proxy server 20. The view change information may indicate that the user view is switched to the first wireless handheld user device in one embodiment or away from the first wireless handheld user device in another embodiment. The first wireless handheld user device may also detect a view change indicating that the user view is switched to it by detecting a user input from the display 550 or the physical buttons/keys 580.

If the first wireless handheld user device sends view change information indicating that the user view is switched away from the first wireless handheld user device and the distance is less than the predefined threshold, the first wireless handheld user device should receive content having equal or worse quality and the standalone user device should receive content of equal or better quality, as described previously with respect to FIG. 4B. Afterward, if the standalone user device sends a view change information indicating that the user view is switched away from the first standalone user device and the distance is still less than the predefined threshold, the qualities of the contents respectively received by the standalone and the wireless handheld user devices should be restored to those before the first view change information is transmitted to the proxy server 20.

If the first wireless handheld user device sends view change information indicating that the user view is switched to the first wireless handheld user device and the distance is less than the predefined threshold, the first wireless handheld user device should receive content having equal or worse quality and the standalone user device should receive content having equal or worse equality, according to, for example, the process described above with respect to FIG. 4.

If there is a second wireless handheld user device is also within the predefined threshold distance with respect to the standalone user device and the related information is allowed to be sent to more than one user device, the image (graphic) portion of the related information is received by the higher priority one of the user devices not receiving the video program and the text portion is received by the lower priority one of the user devices not receiving the video program. The change of quality of content received by the first wireless handheld user device in response to the user view switching into or away from the first wireless handheld user device can be derived from the previously description related to FIG. 4B.

As described above, the present principles of the invention provide desirable distributions of video programs and information related to video programs to a standalone user device, such as a smart TV, and one or more of wireless hand-held electronic devices, such as mobile telephone devices, touch tablets, personal computers (PC), remote control devices, and/or other devices that advantageously are capable of receiving video programs from a server. A requested program and the information related to the requested program (the related information) are preferably transmitted to two different user devices to save bandwidth according to a distance between the standalone user device and the other user devices involved in a video session. The quality of content may depend on the view of the user, such that the user device having the user view should receive content having best quality allowable by the available quality at the server.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method of distributing a video program to first and second devices, the method comprising:
    receiving a request for the video program from one of the first and second devices, both registered in an account at a server;
    transmitting the video program, but not information related to the video program, to a first selected one of the two devices according to a distance between the two devices;
    transmitting the information related to the video program, but not the video program, to a second selected one of the two devices according to the distance;
    if the distance is less than a predefined threshold, selecting the first device as the first selected one device and selecting the second device as the second selected one device; and
    if the distance is greater than the predefined threshold, selecting the second device as the first and second selected one devices, and transmitting no video program and no information related to the video program to the first device.

2. The method of claim 1, wherein the first device is registered as a standalone device and the second device is registered as a handheld device.

3. The method of claim 1, wherein the first selected one device is different from the second selected one device.

4. The method of claim 3, further comprising:
    determining available bandwidth B;
    determining a bandwidth requirement B1 of the first selected one device and a bandwidth requirement B2 of the second selected one device;
    if B<B1, allocating B to the first selected one device and no bandwidth to the second selected one device, and transforming the video program to satisfy B; and
    if B is not less than B1, allocating B1 to the first selected one device, if B−B1 is not less than B2, allocating B2 to the second selected one device, and if B−B1 is less than B2, allocating B−B1 to the second selected one device and transforming the no information related to the video program to satisfy B−B1.

5. The method of claim 3, further comprising
    determining status of each of the two devices;
    if both devices are not active, terminating transmissions of the video program and the no information related to the video program;
    if both devices are active, maintaining transmissions of the video program and the no information related to the video program; and
    if only one device is active, transmitting both the video program and the no information related to the video program to the active device, and no video program and no information related to the video program to the inactive device.

6. The method of claim 1, further comprising
    obtaining location information of the first device;
    obtaining location information of the second device; and
    determining the distance according to the obtained location information of the first device and the obtained location information of the second device.

7. The method of claim 6, wherein if obtaining the location information of the second device fails, the distance is determined to be greater than the predefined threshold.

8. The method of claim 6, wherein obtaining the location information of the first device comprises checking distance information of the first device in a user profile of a user.

9. The method of claim 1, wherein if the request is from the first device, the method further comprises:
if the distance is less than a predefined threshold, selecting the first device as the first selected one device and selecting the second device as the second selected one device; and
if the distance is greater than the predefined threshold, selecting the first device as the first and second selected one devices, and transmitting no video program and no information related to the video program to the second device.

10. A server for transmitting a video program and information related to the video program to first and second devices, both registered in an account at the server, the server comprising:
a storage; and
a processor executing software stored in the storage;
wherein the processor is configured to receive a request for the video program from one of the first and second devices; transmit the video program, but not information related to the video program, to a first selected one of the two devices according to a distance between the two devices; and transmit the information related to the video program, but not the video program, to a second selected one of the two devices according to the distance; and
wherein if the distance is less than a predefined threshold, the processor is configured to select the first device as the first selected one device and selecting the second device as the second selected one device; and if the distance is greater than the predefined threshold, the processor is configured to select the second device as the first and second selected one devices, and transmitting no video program and no information related to the video program to the first device.

11. The server of claim 10, wherein the first device is registered as a standalone device and the second device is registered as a handheld device.

12. The server of claim 10, wherein the first selected one device is different from the second selected one device.

13. The server of claim 12, wherein the processor is configured to determine available bandwidth B of the server, a bandwidth requirement B1 of the first selected one device and a bandwidth requirement B2 of the second selected one device; if B<B1, allocate B to the first selected one device and transform the video program to satisfy B; if B is not less than B1, allocate B1 to the first selected one device, if B−B1 is not less than B2, allocate B2 to the second selected one device, and if B−B1 is less than B2, allocate B−B1 to the second selected one device and the processor is configured to transform the information related to the video program to satisfy B−B1.

14. The server of claim 12, wherein the processor is configured to determine status of each of the two devices; if both devices are not active, the processor terminates transmissions of the video program and the information related to the video program; if both devices are active, the processor maintains transmissions of the video program and the information related to the video program; and if only one device is active, the processor transmits both the video program and the no information related to the video program to the active device, and no video program and no information related to the video program to the inactive device.

15. The server of claim 10, wherein the processor is configured to obtain location information of the first device and location information of the second device, and determine the distance according to the obtained location information of the first device and the obtained location information of the second device.

16. The server of claim 15, wherein if the processor fails to obtain the location information of the second device, the processor is configured to determine that the distance is greater than the predefined threshold.

17. The server of claim 15, wherein the processor is configured to obtain the location information of the first device by checking distance information of the first device in a user profile of a user.

18. The server of claim 10, wherein if the request is from the first device and if the distance is less than a predefined threshold, the processor is configured to select the first device as the first selected one device and selecting the second device as the second selected one device; and if the distance is greater than the predefined threshold, select the first device as the first and second one selected devices, and transmitting no video program and no information related to the video program to the second device.

* * * * *